United States Patent
Sorida

(10) Patent No.: US 7,994,673 B2
(45) Date of Patent: Aug. 9, 2011

(54) GENERATOR

(76) Inventor: Koji Sorida, Hiroshima (JP)

( * ) Notice: Subject to any disclaimer, the term of this patent is extended or adjusted under 35 U.S.C. 154(b) by 94 days.

(21) Appl. No.: 12/448,871

(22) PCT Filed: Feb. 9, 2009

(86) PCT No.: PCT/JP2009/000502
§ 371 (c)(1),
(2), (4) Date: Jul. 10, 2009

(87) PCT Pub. No.: WO2009/101786
PCT Pub. Date: Aug. 20, 2009

(65) Prior Publication Data
US 2010/0289358 A1  Nov. 18, 2010

(30) Foreign Application Priority Data
Feb. 13, 2008  (JP) .................. 2008-031932

(51) Int. Cl.
*H02K 13/00* (2006.01)

(52) U.S. Cl. ...................... 310/115; 310/143

(58) Field of Classification Search .................. 310/83, 310/115, 118, 143, 232
See application file for complete search history.

(56) References Cited

U.S. PATENT DOCUMENTS

| 561,699 | A | * | 6/1896 | Cooley | 318/719 |
| 859,368 | A | * | 7/1907 | Collins | 310/115 |
| 3,602,749 | A | * | 8/1971 | Esters | 310/154.21 |
| 4,021,690 | A | * | 5/1977 | Burton | 310/67 R |
| 4,084,445 | A | * | 4/1978 | Erwin | 74/61 |
| 5,917,248 | A | * | 6/1999 | Seguchi et al. | 290/31 |
| 5,949,174 | A | * | 9/1999 | Moss et al. | 310/233 |
| 6,005,358 | A | * | 12/1999 | Radev | 318/139 |
| 6,476,513 | B1 | * | 11/2002 | Gueorguiev | 290/55 |

FOREIGN PATENT DOCUMENTS

| JP | 61-015548 | 1/1986 |
| JP | 01-286750 | 11/1989 |
| JP | 04-021175 | 2/1992 |

* cited by examiner

*Primary Examiner* — Dang D Le
(74) *Attorney, Agent, or Firm* — Flynn, Thiel, Boutell & Tanis, P.C.

(57) ABSTRACT

A stator 60 is rotated in a direction opposite to that of a rotor 20 to improve output of a generator 9. A stator 60 is rotationally fixed to a main shaft 10. A rotor is fixed to the main shaft rotated by outer force. A main gear 25 is fixed to the main shaft. A ring gear 32 is fixedly positioned with respect to the stator. Pinion gears 43 are disposed between the mains shaft and the ring gear. Rotation of the main shaft in a forward direction rotates the stator in a reverse direction. A pair of slip collars 4a, 4b are concentrically mounted to the rear cover 71 that concurrently rotates with the stator. Output circuits 6a, 6b, 6c of the stator coils 5a, 5b, 5c are connected to the slip collars. Brushes 7a, 7b for slip collars are connected to a rear-side base member 55 fixedly secured to a base plate 50. Electricity is output through the brushes for slip collars.

2 Claims, 7 Drawing Sheets

GENERATOR

TECHNICAL FIELD

The present invention relates to a compact size generator used for automobiles and other objects.

TECHNICAL BACKGROUND

A compact size generator is mounted on automobiles to be used for charging batteries and for providing electricity to electric components. This type of generator consists of a rotor to be rotated by outer force such as an engine, and a stator fixedly secured so as to surround the rotor.

DISCLOSURE OF THE INVENTION

Problems to be Solved by the Invention

The above conventional generator needs to be improved in its generating efficiency because electricity is produced only by rotation of the rotor. It is therefore an object of the present invention to provide a generator having improved output generating efficiency by rotating the stator in a direction opposite to that of the rotor.

Means to Solve the Problems

Definition of term: the wording "rotationally support" designates a condition that an object is supported by a bearing capable of rotation.

The present invention will be described referring to FIGS. 1 to 7. A generator 9 according to a first aspect of the present invention comprises a main shaft 10 to be rotated by outer force. A cylindrical rotor 20 having a rotor coil 1 is fixed to the periphery of the middle portion of the main shaft 10. A front cover 40 is mounted to the periphery of the main shaft 10 at a front side of the rotor 20 through a bearing 41 for front cover 40. The front cover 40 comprises a step portion 40a at an outer circumference of its rear face. A front end of a front-side external cylinder 31 is fitted and fixed to the step portion 40a. A substantially cylindrical stator core portion 61, a rear-side external cylinder 70 and a rear cover 71 are disposed at a rear side of the front-side external cylinder 31, in this order. The rear cover 71 is provided with a step portion for fitting the rear-side external cylinder 70. Long bolts 73 are inserted from the outer surface of the front cover 40 and pass through the rear cover 71. The long bolts 73 are tightened by respective tightening nuts 73a. Accordingly, the front cover 40, front-side external cylinder 31, stator core portion 61 and rear cover 71 are combined together. A tubular portion 56 projects forward from a rear-side base member 55 disposed at a rear side of the rear cover 71. The tubular portion 56 projecting from the rear-side base member 55 is inserted in the center of the rear cover 71, and it supports the rear cover 71 capable of rotation. Pinion gears 43 are disposed between the main gear 25 fixed to the main shaft 10 and the ring gear 32 fixedly positioned with respect to the stator 60. Each pinion gear 43 has a fixed pinion shaft 42. Accordingly, rotation of the main shaft 10 in a forward direction rotates the stator 60 in a reverse direction through the pinion gears 43 and the inner ring gear 32. A pair of slip collars 4a, 4b are concentrically provided to the rear cover 71 that concurrently rotates with the stator 60. Output circuits 6a, 6b, 6c of the stator coils 5a, 5b, 5c are connected to the slip collars 4a, 4b through a rectification circuit 62. A plurality of brushes 7a, 7b for slip collars 4a, 4b are adapted to make contact with the slip collars 4a, 4b. The brushes 7a, 7b are mounted to the rear-side base member 55 that is fixedly positioned with respect to a base plate 50. Electricity is output through the brushes 7a, 7b.

A generator according to a second aspect of the present invention comprises a main shaft 10 to be rotated by outer force. A cylindrical rotor 20 having a rotor coil 1 is fixed to the outer periphery of the middle portion of the main shaft 10. A pair of slip rings 2a, 2b are provided to the main shaft 10 at a rear side of the rotor 20. The slip rings 2a, 2b are connected to respective terminals 1a, 1b of conductive wires of a rotor coil 1. Brushes 3a, 3b are connected to a rectification circuit 62 and make sliding contact with the respective slip rings 2a, 2b. A front cover 40 is mounted to the periphery of the main shaft 10 at a front side of the rotor 20 through a bearing 41 for front cover 40. An inner ring gear 32 is fixed concentrically at a front face of the front cover 40. A main gear 25 is fixed to the circumference of the main shaft 10 at a front side of the bearing 41 for front cover 40. The main gear 25 and the inner ring gear 32 are disposed on the same plane. A portion of the main shaft 10 at a front side of the main gear 25 is rotationally supported by a front-side base member 51 that stands on a base plate 50. Pinion gears 43 are fixed to rear ends of respective pinion shafts 42 that are rotationally supported by the front-side base member 51. The pinion gears 43 are adapted to engage with both the main gear 25 and the inner ring gear 32. The front cover 40 comprises a step portion 40a at an outer circumference of its rear face. A front end of a front-side external cylinder 31 is fitted and fixed to the step portion 40a. A substantially cylindrical stator core portion 61, a rear-side external cylinder 70 and a rear cover 71 are disposed at a rear side of the front-side external cylinder 31, in this order. The rear cover 71 is provided with a step portion for fitting the rear-side external cylinder 70. Long bolts 73 are inserted from the outer surface of the front cover 40 and pass through the rear cover 71. The long bolts 73 are tightened by respective tightening nuts 73a. Accordingly, the front cover 40, front-side external cylinder 31, stator core portion 61 and rear cover 71 are combined together. A tubular portion 56 projects forward from a rear-side base member 55 disposed at a rear side of the rear cover 71. The tubular portion 56 projecting from the rear-side base member 55 is inserted in the center of the rear cover 71, and it supports the rear cover 71 capable of rotation. The stator 60 is disposed at an outer circumference of the rotor 20 through a small gap 63 between them. A circular middle wall 65 is provided to an inner circumference of a rear-side external cylinder 70 disposed at a rear side of the stator 60. A rectification circuit 62 is mounted to the middle wall 65. A rear portion of the main shaft 10 is adapted to make no contacts with the middle wall 65 and the tubular portion 56 to pass through them, and is rotationally supported by the rear-side base member 55 that stands on a base plate 50. A pair of small and large slip collars 4a, 4b are provided concentrically with the tubular portion 56 at a rear face of the rear cover 71. The slip collars 4a, 4b are connected to respective output-side terminals 8a, 8b of the rectification circuit 62. The slip collars 4a, 4b are in sliding contact with brushes 7a, 7b for slip collars 4a, 4b provided to the rear-side base member 55. Electricity generated by the stator coils 5a, 5b, 5c is output through the output circuits 6a, 6b, 6c, the rectification circuit 62, the output-side terminals 8a, 8b of the rectification circuit 62, the slip collars 4a, 4b and the brushes 7a, 7b for slip collars 4a, 4b.

Effects of the Invention

In the generator having the above structure, the main shaft 10 rotated by outer force (an engine, for example) in a forward direction causes the main gear 25 to rotate in the same forward direction. Then, the rotation of the main gear 25 in the forward direction causes the stator 60 to rotate in a reverse direction, as the rotation in the forward direction is reversed to the opposite direction by the pinion gears 43 and the inner ring gear 32. Accordingly, the substantial number of rotations of the rotor 20 with respect to the stator 60 can be increased without increasing the number of rotations of the rotor 20 itself. This improves output from the stator 20, and provides much more increased generating efficiency than the conventional prior art provided with a stator not rotationally fixed.

DESCRIPTION OF NUMERALS

Figure 1:
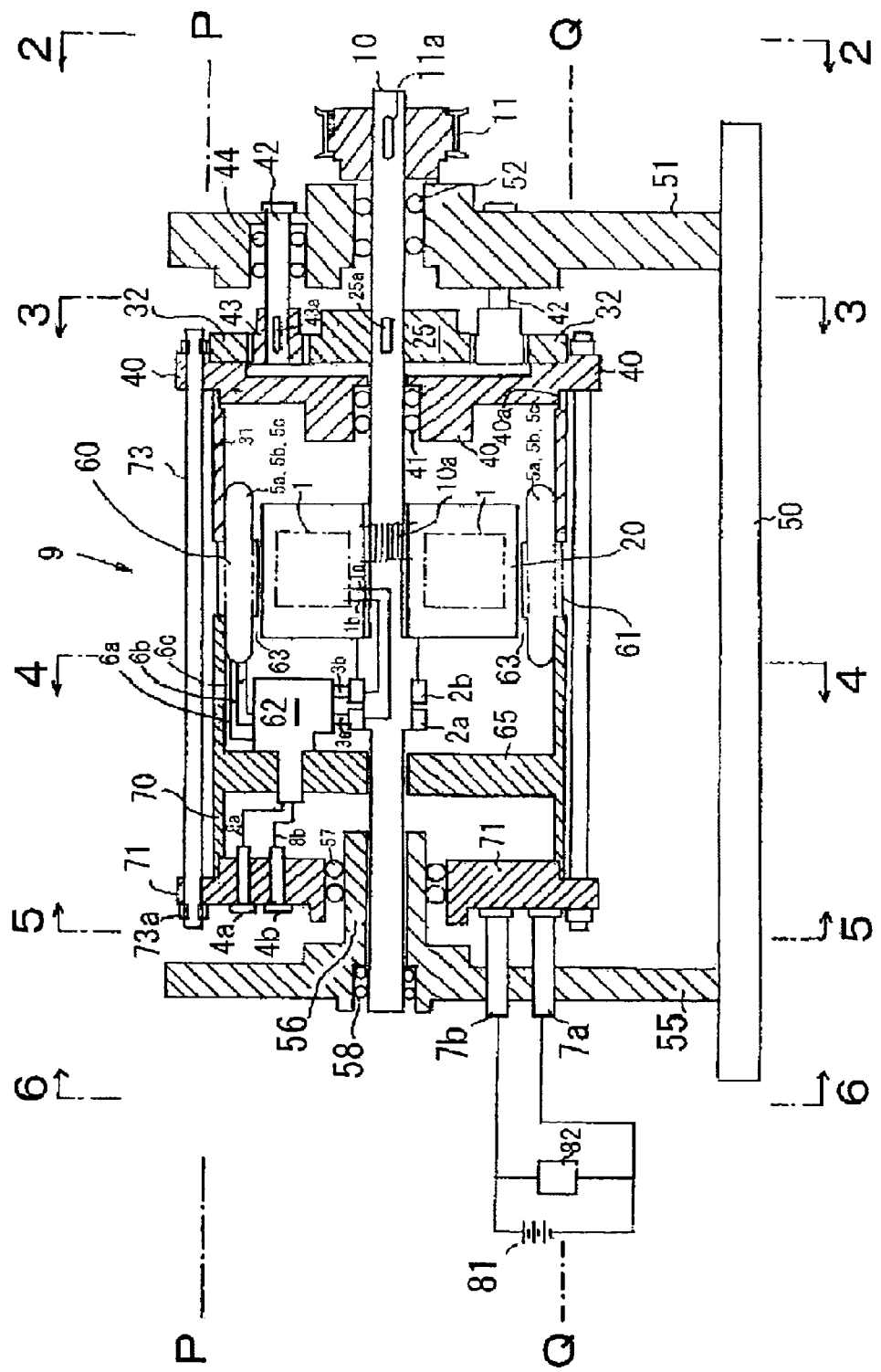
FIG. 1 is a partially broken front elevation view (sectional view along the line 1-1 in FIG. 2, showing a generator according to a preferred embodiment of the present invention.
Figure 2:
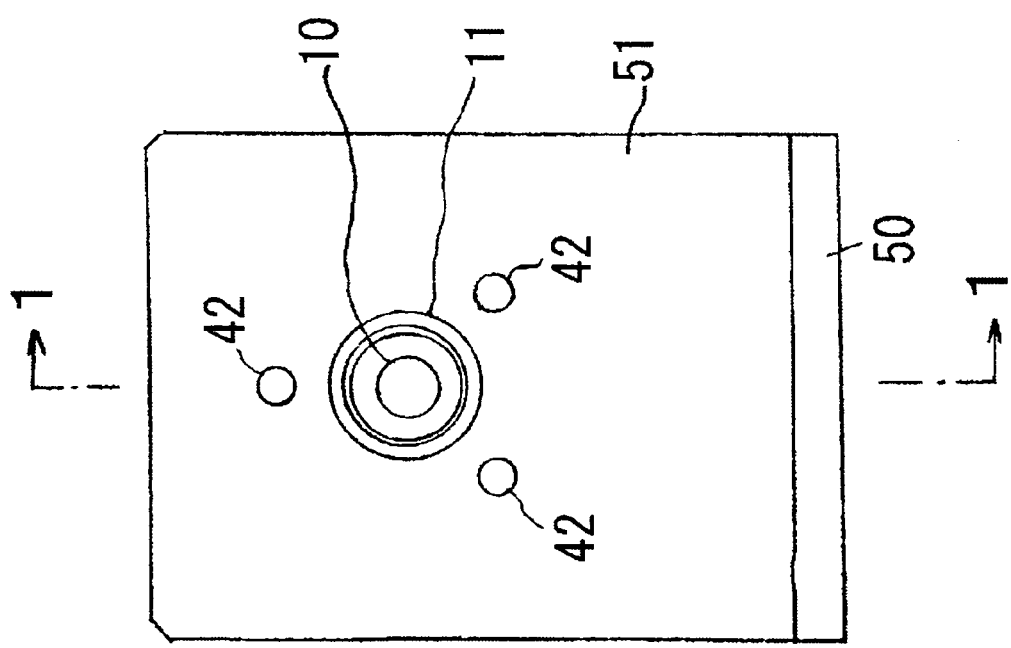
FIG. 2 is a side elevation view viewed from the line 2-2 in FIG. 1.
Figure 3:
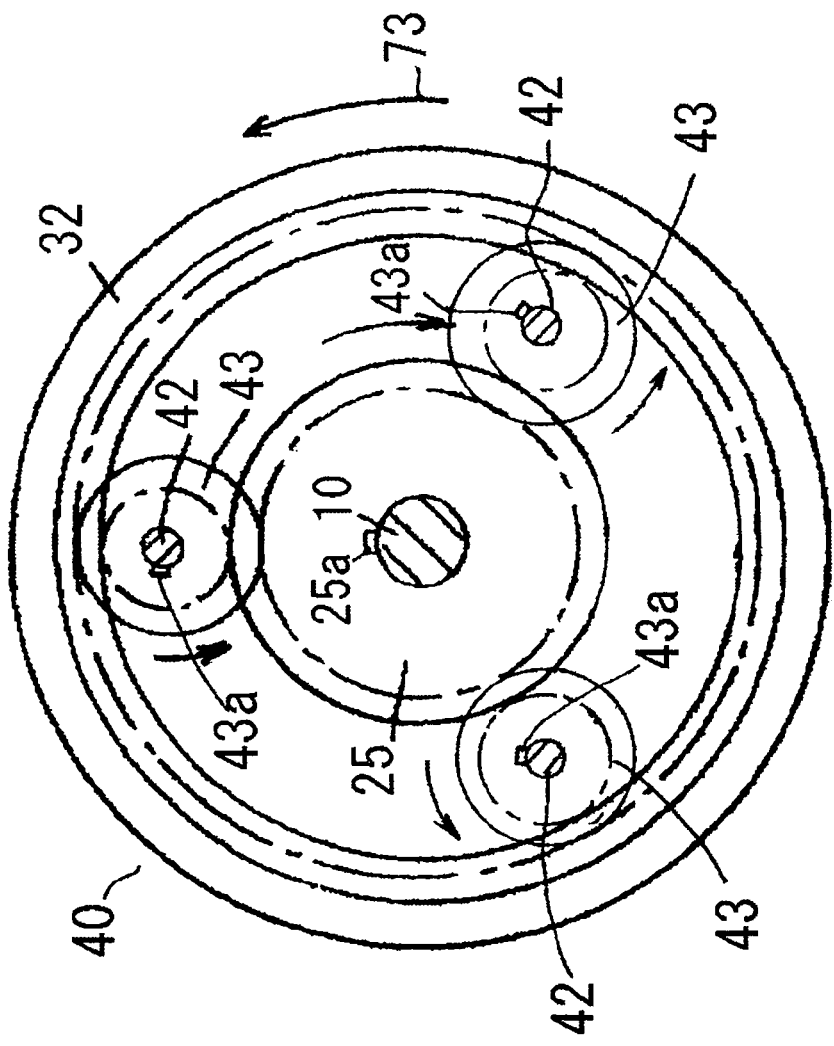
FIG. 3 is a view viewed from the line 3-3 in a zone defined by the lines P-Q in FIG. 1.
Figure 4:
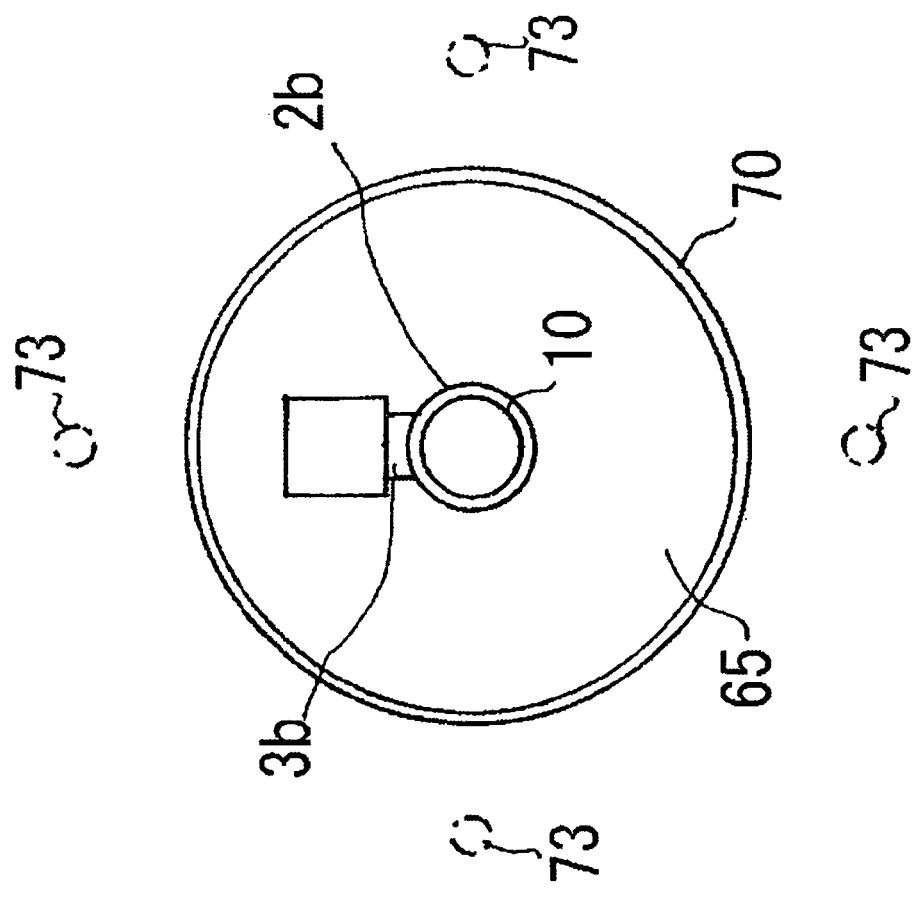
FIG. 4 is a view viewed from the line 4-4 in a zone defined by the lines P-Q in FIG. 1.
Figure 5:
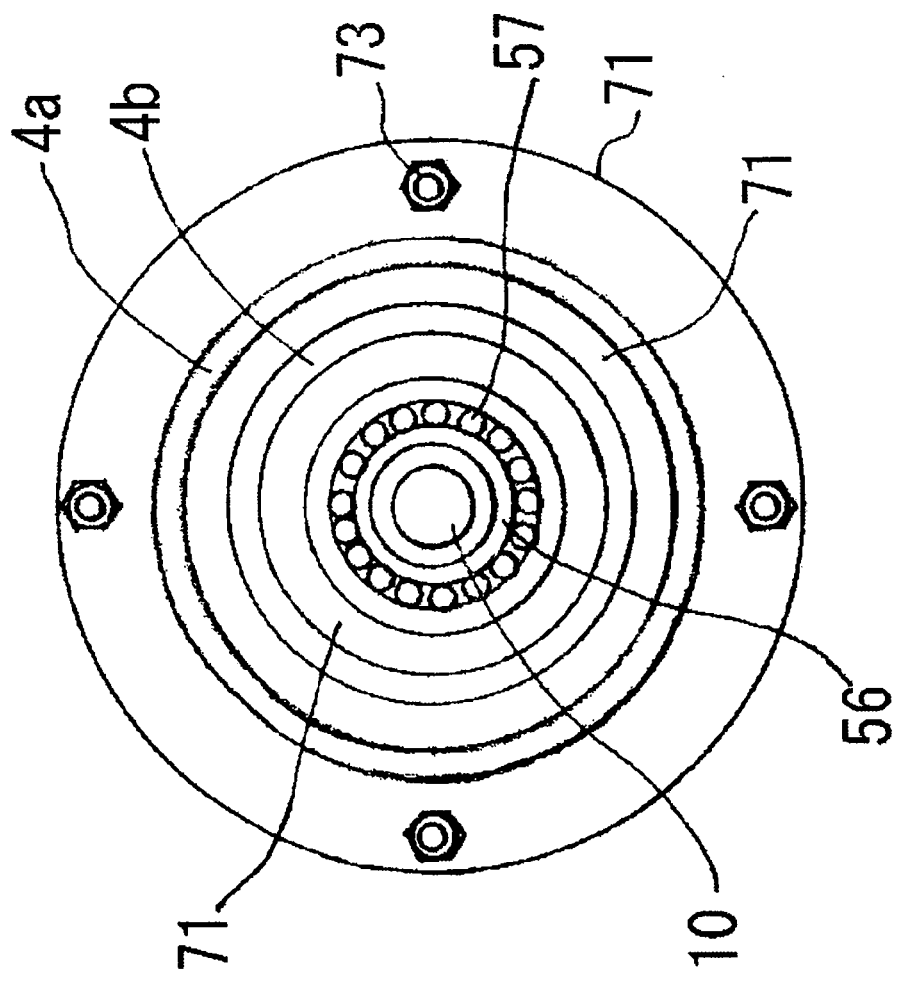
FIG. 5 is a view viewed from the line 5-5 in a zone defined by the lines P-Q in FIG. 1.
Figure 6:
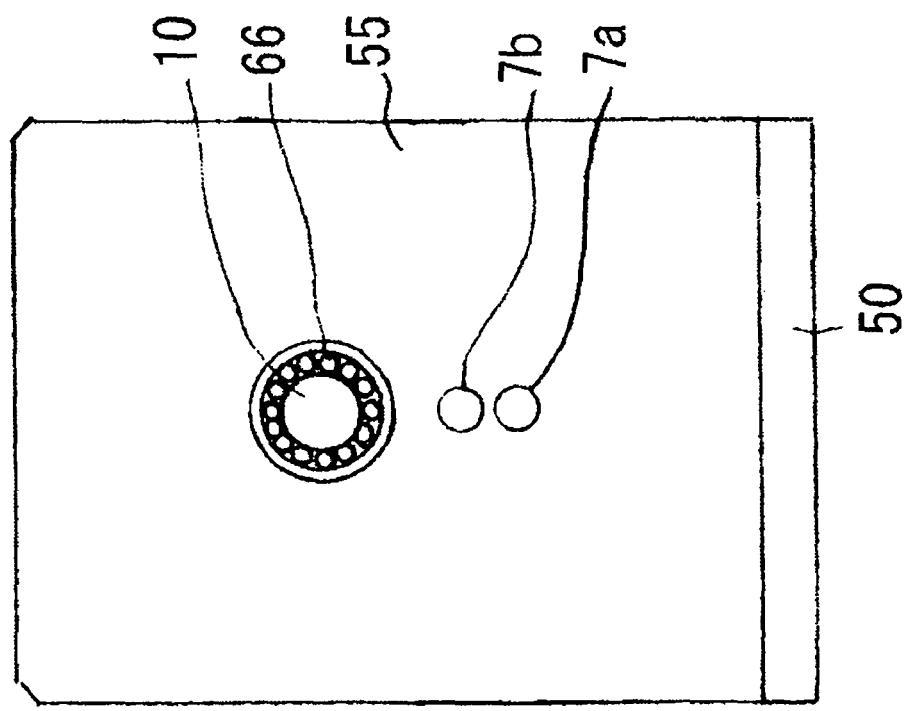
FIG. 6 is a view viewed from the line 6-6 in FIG. 1.
Figure 7:
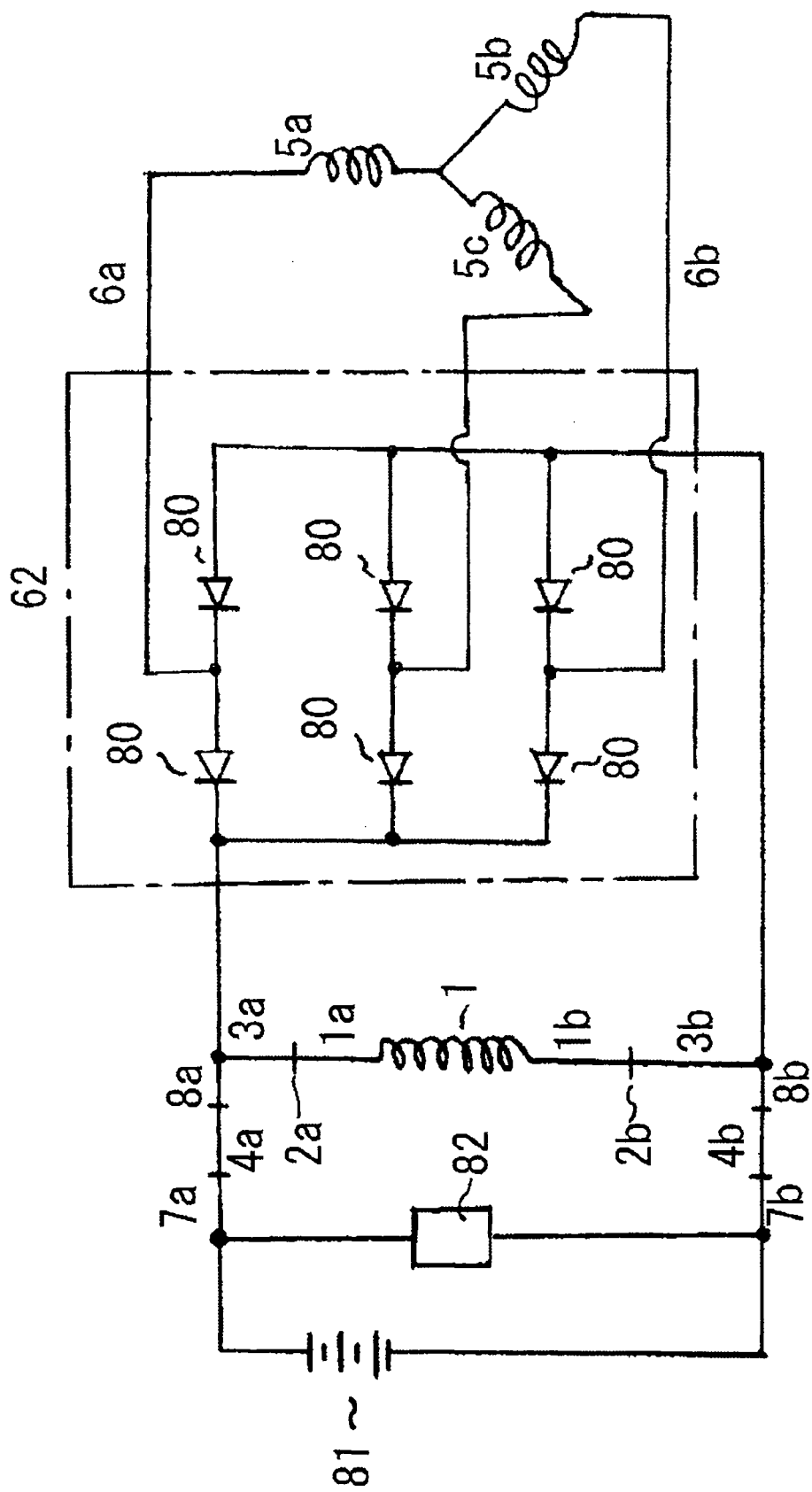
FIG. 7 is a connection diagram of the generator shown in FIG. 1.

1 rotor coil
1a, 1b terminal (of rotor coil)
2a, 2b slip ring
3a, 3b brush (for slip ring)
4a, 4b slip collar
5a, 5b, 5c stator coil
6a, 6b, 6c output circuit (of stator coil)
7a, 7b brush (for slip collar)
8a, 8b output-side terminal (of rectification circuit)
9 generator
10 main shaft
10a jagged convexity
11 pulley
11a key (for pulley)
20 rotor
25 main gear
25a key (for main gear)
31 front-side external cylinder
32 ring gear
40 front cover
40a step portion (of front cover)
41 bearing (for front cover)
42 pinion shaft
43 pinion gear
43a key (for pinion gear)
44 bearing (for pinion shaft)
50 base plate
51 front-side base member
52 bearing (for front-portion of main shaft)
55 rear-side base member
56 tubular portion
57 bearing (for rear cover)
58 bearing (for rear-portion of main shaft)
60 stator
61 stator core portion
62 rectification circuit
63 gap
65 middle wall
70 rear-side external cylinder
71 rear cover
73 long bolt
73a tightening nut
80 diode
81 battery
82 electric component

BEST MODE FOR CARRYING OUT THE INVENTION

A generator according to the preferred embodiment of the present invention will be described exemplifying a three-phase AC generator for automobiles. This generator 9 comprises a main shaft 10, and a rotor 20 having a rotor coil 1 fixed to the circumference of a middle portion of the main shaft 10 through a jagged convexity 10a that is formed on a surface of the main shaft 10. The rotor 20 has substantially a thick cylindrical form.

A pair of slip rings 2a, 2b are provided to the main shaft 10 at a rear side of the rotor 20. The slip rings 2a, 2b are connected to respective terminals 1a, 1b of conductive wires of the rotor coil 1. The slip rings 2a, 2b are adapted to make sliding contacts with respective brushes 3a, 3b connected to a rectification circuit 62. This allows excitation current to flow in the rotor coil 1 to form the North Pole and the South Pole in a rotor core.

A front cover 40 is mounted to the periphery of the main shaft 10 at a front side of the rotor 20 through a bearing 41 for front cover 40. An inner ring gear 32 is fixed concentrically at a front face of the front cover 40.

A main gear 25 is fixed to the circumference of the main shaft 10 at a front side of the bearing 41 for front cover 40. A key 25a for main gear 25 is provided between the main shaft 10 and the main gear 25 to engage them. The main gear 25 and the inner ring gear 32 are concentrically positioned on the same plane.

A portion of the main shaft 10 at a front side of the main gear 25 is rotationally supported by a front-side base member 51 through a bearing 52 for front-portion of main shaft 10.

A plurality of pinion shafts 42 are rotationally fixed to the front-side base member 51 through respective bearings 44 for pinion shafts 42. Pinion gears 43 are fitted and fixed to respective rear end circumferences of the pinion shafts 42 through respective keys 43a for pinion gears 43. Each of the pinion gears 43 engages with both the main gear 25 and the inner ring gear 32.

The front cover 40 comprises a step portion 40a at an outer circumference of its rear face. A front end of a front-side external cylinder 31 is fixed to the step portion 40a. A substantially cylindrical stator core portion 61, a rear-side external cylinder 70 and a rear cover 71 are disposed at a rear side of the front-side external cylinder 31, in this order. The rear cover 71 is provided with a step portion for fitting the rear-side external cylinder 70. Long bolts 73 are inserted backward from the outer surface of the front cover 40 and pass through the rear cover 71. Each of the long bolts 73 is tightened by a corresponding tightening nut 73a. Accordingly, the front cover 40, front-side external cylinder 31, stator core portion 61 and rear cover 71 are combined together. A tubular portion 56 projects forward from a rear-side base member 55 disposed at a rear side of the rear cover 71. The tubular portion 56 projecting from the rear-side base member 55 is inserted in the center of the rear cover 71, and it supports the rear cover 71 capable of rotation through a bearing 57 for rear cover 71.

The stator 60 consists of stator coils 5a, 5b, 5c connected in a "Y" form, and is positioned in the vicinity of the outer circumference of the rotor 20 through a small gap 63 between them. The stator 60 and the rotor 20 form the core of the generator.

A circular middle wall 65 is provided to an inner circumference of a rear-side external cylinder 70 disposed at a rear side of the stator 60. The rectification circuit 62 is mounted to the middle wall 65. A rear portion of the main shaft 10 is adapted to make no contacts with the middle wall 65 and the tubular portion 56 to pass through them, and is rotationally supported by the rear-side base member 55 through a bearing 58 for rear-side base member 55.

A pair of small and large slip collars 4a, 4b are provided concentrically with the tubular portion 56 at a rear face of the rear cover 71. The slip collars 4a, 4b are connected to respective output-side terminals 8a, 8b of the rectification circuit 62. The slip collars 4a, 4b are in sliding contact with brushes 7a, 7b for slip collars 4a, 4b. Electricity generated from the stator coils 5a, 5b, 5c is output through the output circuits 6a, 6b, 6c and the rectification circuit 62 having a diode 80, and is provided to a battery 81 and electric component 82. Both the front-side base member 51 and the rear-side base member 55 stand on the base plane 50.

In the generator 9 according to the preferred embodiment, the main shaft 10 rotates by outer force provided from an engine through a pulley 11. The rotation of the main shaft 10 causes the rotor 20 to rotate in a forward direction, and it causes the front-side external cylinder 31, rear-side external cylinder 70, front cover 40 and rear cover 71 to rotate in a reverse direction. Accordingly, this allows the stator 60 fixed to the front-side external cylinder 31 and the rear-side external cylinder 70 to rotate to generate current in the stator coils 5a, 5b, 5c. The current is then output through the brushes 7a, 7b for slip collars 4a, 4b.

In this stage, the stator 60 rotates simultaneously with the rotor 20 but in the opposite direction, which substantially increases the number of rotations of the rotor 20 with respect to the stator 60. This allows the rotating stator 60 to produce large amount of electricity more efficiently than the conventional fixed stator.

The generator 9 in the preferred embodiment allows efficient production of electricity. This technique produces the same amount of electricity with lower rotation than the conventional prior art. This technique also contributes in saving energy. In particular, the conventional generator required the rotor 20 to rotate for 1200 revolutions in a certain time in order to produce a predetermined amount of electricity, while the generator in the preferred embodiment requires only 700 revolutions.

The generator according to the present invention enables each construction member to be constructed with one another, and a plurality of the constructed members to be constructed with one another to form a fully constructed generator. The generator in the preferred embodiment uses three pinion gears 43, but the present invention does not restrict the number of the pinion gears 43 to be used, and thus more than three pinion gears 43 can be used. The generator according to the present invention can be applied as a private electric generator to any fields other than the automotive field.

INDUSTRIAL APPLICABILITY

The generator according to the present invention can be used as a charging generator for exclusive use for batteries that are used for driving automobiles. Further, the generator can be used for large-scale wind electricity generation and domestic-use wind electricity generation. The generator to be used for the domestic wind electricity generation can be designed to have a cylinder type wings to make the generator be compact. Moreover, the generator according to the present invention can be applied as an emergency electricity generator for industrial and domestic use.

The invention claimed is:

1. A generator comprising: a main shaft 10 to be rotated by an outer force; a cylindrical rotor 20 having rotor coil 1 being fixed to an outer periphery of a middle portion of the main shaft; a front cover 40 mounted to the periphery of the main shaft at a front side of the rotor through a bearing 41 for front cover; a front-side external cylinder 31 whose front end is fixed to a step portion 40a, the step portion is provided at an outer periphery of a rear face of the front cover; a substantially cylindrical stator core portion 61, a rear-side external cylinder 70 and a rear cover 71 being disposed at a rear side of the front-side external cylinder in this order, the rear cover is provided with a step portion for fitting the rear-side external cylinder; long bolts 73 inserted from the outer surface of the front cover, the long bolts pass through the rear cover 71, the long bolts are tightened by respective tightening nuts 73a, the long bolts combine the front cover 40, the front-side external cylinder 31, the stator core portion 61, the rear-side external cylinder 70 and the rear cover 71; a tubular portion 56 projected forward from a rear-side base member 55 disposed at a rear side of the rear cover, the tubular portion projecting from the rear-side base member is inserted in the center of the rear cover, the cylinder portion supports the rear cover capable of rotation; a stator 60 disposed at an outer circumference of the rotor through a small gap 63 between them; a main gear 25 fixed to the main shaft; a ring gear 32 fixedly positioned with respect to the front cover 40; pinion gears 43 disposed between the main gear 25 and the ring gear 32, each pinion gear has a fixed pinion shaft 42, rotation of the main shaft in a forward direction rotates the stator 60 in a reverse direction through the main gear and the pinion gears and the inner ring gear; a pair of slip collars 4a, 4b concentrically provided to the rear cover, the rear cover 71 concurrently rotates with the stator 40; output circuits 6a, 6b, 6c of stator coils 5a, 5b, 5c connected to the slip collars through a rectification circuit 62; and brushes 7a, 7b for slip collars connected to a rear-side base member 55 fixedly secured to a base plate 50, the brushes for slip collars come to contact with the slip collars, the brushes for slip collars output electricity.

2. A generator comprising: a main shaft 10 to be rotated by an outer force; a cylindrical rotor 20 having a rotor coil 1 being fixed to an outer periphery of a middle portion of the main shaft; a pair of terminals 1a, 1b provided to the main shaft at a side of the rotor 20, a pair of slip rings 2a, 2b are connected to respective terminals of conducting wires of the rotor coil 1; brushes 3a, 3b adapted to make sliding contact with the slip rings 2a, 2b, the brushes are connected to a rectification circuit 62; a front cover 40 mounted to the periphery of the main shaft at a front side of the rotor through a bearing 41 for the front cover; an inner ring gear 32 fixed concentrically at a front face of the front cover; a main gear fixed to the circumference of the main shaft at a front side of the bearing for the front cover, a main gear 25 and an inner ring gear 32 are disposed in the same plane; a front-side base member 51 adapted to rotationally support a portion of the main shaft at a front side of the main gear, the front-side base member stands on a base plate 50; pinion gears 43 fixed to rear ends of respective pinion shafts 42, the pinion shafts are rotationally supported by the front-side base member, the pinion gears are adapted to engage with both the main gear and the inner ring gear 32; a front-side external cylinder 31 whose front end is fitted and fixed to a step portion 40*a*, the step portion is provided at an outer periphery of a rear face of the front cover 40; a substantially cylindrical stator core portion 61, a rear-side external cylinder 70 and a rear cover 71 being disposed at a rear side of the front-side external cylinder in this order, the rear cover is provided with a step portion for fitting the rear-side external cylinder; long bolts 73 inserted from the outer surface of the front cover, the long bolts pass through the rear cover, the long bolts are tightened by respective tightening nuts 73*a*, the long bolts combine the front cover, the front-side external cylinder 31, the stator core portion 61, the rear-side external cylinder 70 and the rear cover 71; a tubular portion 56 projected forward from a rear-side base member 55 disposed at a rear side of the rear cover, the tubular portion projecting from the rear-side base member is inserted in the center of the rear cover, the tubular portion supports the rear cover capable of rotation; a stator 60 disposed at an outer circumference of the rotor through a small gap 63 between them; a circular middle wall 65 provided to an inner circumference of a rear-side external cylinder 70, the rear-side external cylinder 70 is disposed at a rear side of the stator 60; a rectification circuit 62 mounted to the middle wall 65; a rear portion of the main shaft adapted to make no contact with the middle wall and the tubular portion to pass through them, the rear portion of the main shaft is rotationally supported by the rear-side base member, the rear-side base member stands on a base plate; a pair of small and large slip rings 4*a*, 4*b* provided concentrically with the tubular portion at a rear face of the rear cover; output side terminals 8*a*, 8*b* of the rectification circuit 62 connected to the slip rings collars; brushes 7*a*, 7*b* for slip collars adapted to make sliding contact with the slip collars, the brushes for slip collars are mounted to the rear-side base member; wherein electricity produced at stator coils 5*a*, 5*b*, 5*c* is output through an output circuit 6*a*, 6*b*, 6*c*, the rectification circuit, the output-side terminals of the rectification circuit, the slip collars and brushes for slip collars.

\* \* \* \* \*